Sept. 3, 1940.  F. W. McCARTNEY  2,213,432
BEARING MOUNTING
Filed Feb. 7, 1939   3 Sheets-Sheet 2

Frederick William McCartney
by his attys
Stebbins Blenko & Parmelee

Sept. 3, 1940.  F. W. McCARTNEY  2,213,432
BEARING MOUNTING
Filed Feb. 7, 1939  3 Sheets-Sheet 3

Patented Sept. 3, 1940

2,213,432

UNITED STATES PATENT OFFICE 2,213,432

BEARING MOUNTING

Frederick William McCartney, Slough, England, assignor to Black & Decker Limited, Slough, England, a British company Application February 7, 1939, Serial No. 255,096
In Great Britain March 19, 1938

6 Claims. (Cl. 308—72)

This invention is for improvements in or relating to bearing mountings for rotatable shafts and has for an object to provide an arrangement in which closely fitting plain bearings may be employed for supporting rapidly rotating shafts without causing undue resistance and wear.

According to this invention, a bearing mounting for a rotatable shaft comprises a bearing housing, two plain bearings within said housing, supporting means between the housing and the bearings arranged to permit oscillatory rocking movement of the bearings and resilient means arranged to oppose axial movement of the bearings within the housing. By a "plain bearing" is meant a bearing having an internal cylindrical surface which is arranged to support a cylindrical journal on the rotatable shaft.

The supporting means may comprise, for example, a spherical surface formed on the outside of each plain bearing and two internal conical surfaces or concave surfaces of larger radius of curvature than the spherical surface formed on the inside of the housing or on a part mounted therein and arranged respectively to engage the spherical surfaces. The resilient means are arranged to maintain said surfaces on the bearings and housing in contact. It is found with this arrangement that even if the journal is slightly warped, a close fit may be effected between the bearings and the shaft without causing undue resistance and wear.

Each said conical or concave surface may be formed on a part which is axially slidable in said housing and said spring means is arranged to force said parts towards said spherical surfaces. For example a compression spring may be arranged between the two axially slidable parts.

Each of said axially slidable parts may be formed in two halves separated from one another, one on either side of a plane transverse to the shaft axis, and said housing may be provided at each end thereof with a shoulder against which one half of each axially slidable part abuts. With this arrangement, the spherical surface of each bearing is resiliently gripped between the two halves of said axially slidable parts.

In a bearing mounting in which said shaft is required to resist axial thrust, the shaft is provided with a shoulder arranged to engage one end face of one of said axially slidable parts.

In one constructional form of the invention, each of the plain bearings is provided with an external central cylindrical portion flanked by spherical surfaces and each of the two halves of each axial slidable part is provided with a cylindrical portion of larger diameter than the cylindrical portion of the bearing and a spherical or conical portion at one end thereof, arranged to encircle and engage the spherical surface of the bearing. Such an arrangement is found to be particularly suitable for the grinding-wheel shaft in a grinding machine.

In an alternative construction, said conical or concave surfaces are formed on the housing or a part fixed thereto and the spring means are arranged to engage the said plain bearings so as to force the spherical surface thereon into engagement with the conical or concave surfaces. In such an arrangement, a compression spring may be disposed between end faces formed on the two plain bearings so as to press outwardly and to maintain the spherical surfaces in engagement with the conical or concave surfaces.

The shaft may be provided with a shoulder and a second compression spring may be disposed between that shoulder and an end face of one of said plain bearings or a shoulder on the housing. Such an arrangement is suitable for mounting a rotatable chuck-shaft for holding a work-piece in a grinding machine.

In any of the arrangements referred to above, the plain bearings are formed from a self-lubricating metal compound and the clearance between the shaft and the bearings may be as small as .0001 of an inch.

The following is a description of two embodiments of the invention, reference being made to the accompanying drawings, in which.

Figure 3:
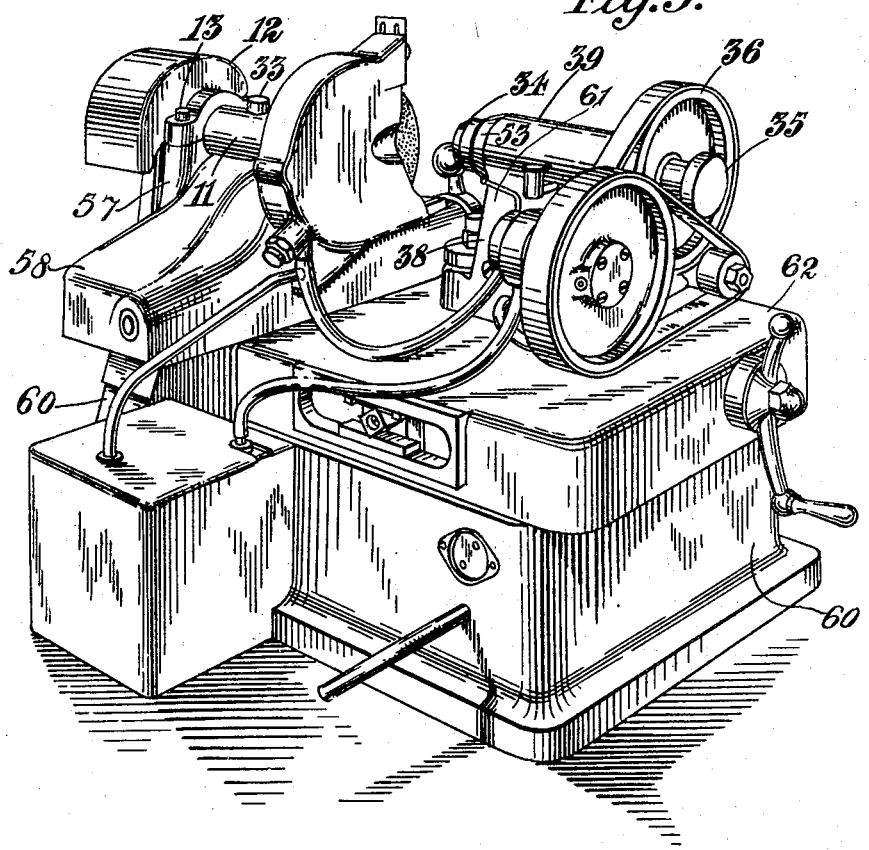
Figure 3 is a perspective view of a grinding machine showing how the grinding-head and rotatable work-chuck are mounted on the base of the machine.

As seen in Figure 3, a grinding-head 57 is carried by a table 58 which is adjustably mounted in a slideway on a base 60. The head 61 which carries the work chuck is supported on a table 62 which is adjustably carried by a second slideway also on the base 60.

Figure 1:
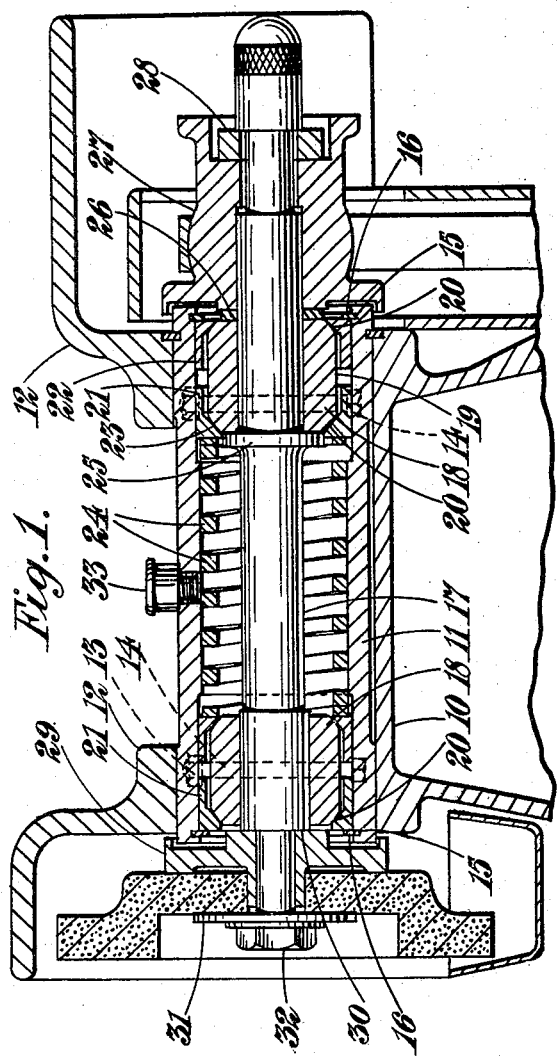
Figure 1 is a vertical section through a grinding head of a grinding machine.

Referring to Figure 1, the grinding head comprises a cradle 10 arranged to support a hollow cylindrical bearing housing 11 which is clamped in the cradle by keeps 12 which are engaged by clamping nuts 13 on studs 14. Each end of the cylindrical bearing housing is provided with an internal circumferential groove 15 in which is mounted a removable split spring-ring 16 of the kind sold under the name of "circlip". A shaft 17 for the grinding wheels extends through the cylindrical housing and is carried by two plain bearings 18 formed from a self-lubricating metal compound. The clearance between the shaft and the bearings may be as low as of the order of .0001" where the diameter of the shaft is at least 1". It will be noted that each bearing is provided with an external cylindrical surface 19 flanked on either side by spherical surfaces 20. Each bearing is supported by a mounting formed in two parts 21 which are spaced apart on either side of a plane transverse to the axis of the shaft. Each part is of such a size as to be axially slidable in the housing. Each part is also provided with an internal cylindrical portion 22 of a larger diameter than the diameter of the cylindrical part of the bearing and with a spherical or conical surface 23 which is arranged to engage one of the surfaces 20 of the bearing. A helical compression spring 24 is arranged to encircle the shaft between the two mountings so as to force the mountings against the shoulders provided by the circlips 16.

Axial movement of the shaft within the bearings is prevented by means of a shoulder 25 formed on the shaft and arranged to bear against an end face at the inner end of one of the bearings and by a washer 26 which is interposed between the other end of the bearing and a pulley 27 which is secured to the shaft by a suitable clamping nut 28. The grinding wheel is carried by a flanged bush 29 which abuts a shoulder 30 at the other end of the shaft. The grinding wheel is secured in position on said bush by a washer 31 and a clamping nut 32 which engages a screwed extremity of said shaft. An oiler 33 extends through the wall of the cylindrical housing 11 intermediate of the two bearings.

Figure 2:
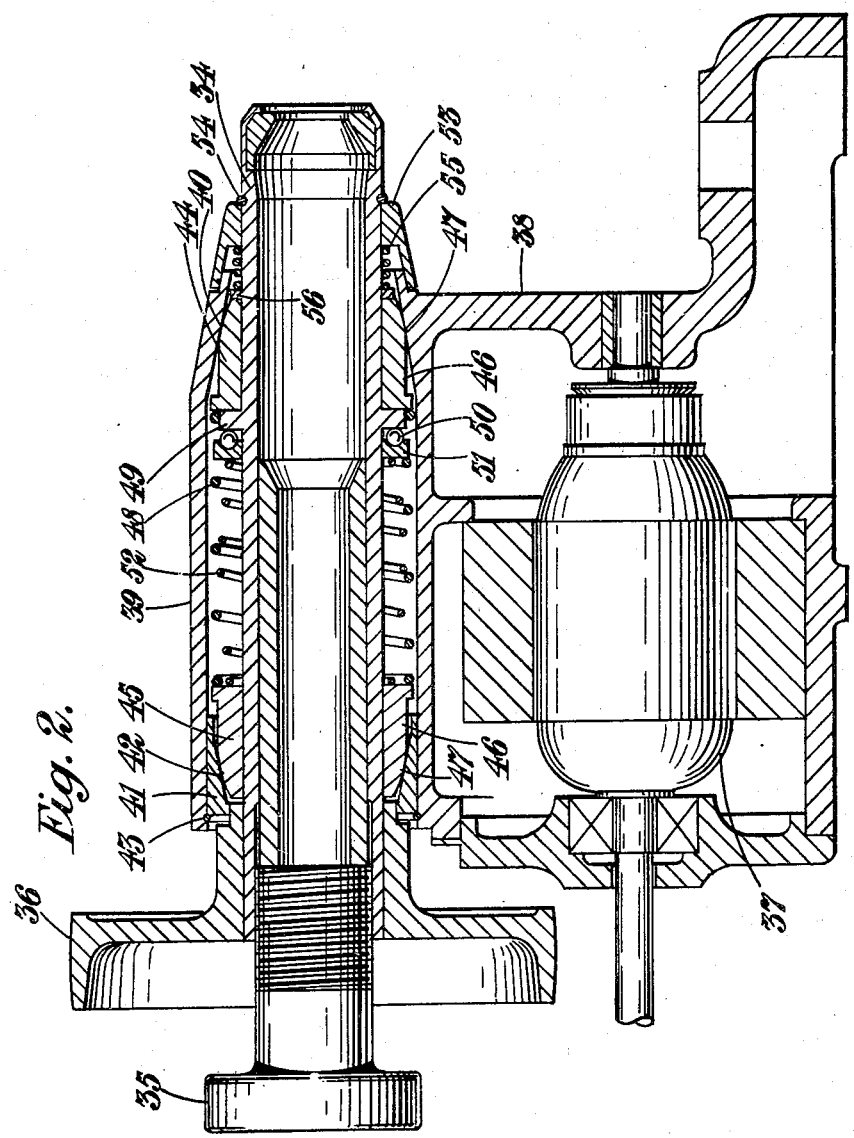
Figure 2 is a vertical section through a head in which the work chuck-shaft is mounted in a grinding machine.

Figure 2 shows an arrangement for mounting a hollow chuck-spindle 34 in a grinding machine for refacing valves. Details of the chuck are not shown except for the manipulating member 35 which extends into the hollow chuck-spindle and is arranged to engage the mechanism, whereby the jaws of the chuck are opened and closed. Secured to the hollow spindle is a driving pulley 36 which is connected through suitable belt-and-pulley gearing with a driving motor 37 located in a hollow head 38. The hollow head is provided with a hollow cylindrical bearing housing 39 which is provided with an internal conical surface 40 at that end adjacent the gripping end of the chuck spindle. Mounted in the other end of the housing is a race 41 having an internal conical face 42. The race is retained within the housing by a spring-ring 43 which engages a groove formed on the inner face of the housing. The hollow spindle is supported in two plain bearings 44 and 45. The outer surface of each plain bearing is made up of a cylindrical portion 46 and a spherical portion 47 which latter, in the case of the bearing 44, is arranged to engage with the conical face 40 of the housing and, in the case of the bearing 45, is arranged to engage with the conical face of the race 41. A helical compression spring 48 is arranged between the inner end faces of the bearings 44 and 45 so as to maintain the conical faces in engagement with the spherical faces in engagement with the conical faces. The hollow chuck spindle is provided with a shoulder 49 which forms one race of a ball thrust bearing 50, the other race 51 of which is engaged by a second helical compression spring 52 which engages the end face of the bearing 45. A cap 53 is arranged to encircle the conical end of the housing and the protruding end of the chuck spindle and is retained in position by a spring-ring 54 against which the cap is pressed by a helical spring 55 which at one end engages an internal shoulder on the cap and at the other end a washer 56 disposed between it and the outer end of the bearing 44.

I claim:
1. A bearing mounting for a rotatable shaft, comprising a bearing housing, two plain metal bearing sleeves spaced apart within said housing and adapted to slide axially on said shaft and having at least a part of their outer surfaces convexly curved, metal supporting means in said housing adapted to engage said convexly curved surfaces and to permit oscillatory rocking movement of each plain bearing sleeve, and a spring arranged between the two plain bearing sleeves and adapted to maintain said convexly curved surfaces in engagement with the supporting means.

2. A bearing mounting for a rotatable shaft, comprising a bearing housing, two plain metal bearing sleeves spaced apart within said housing and adapted to slide axially on said shaft and having at least a part of their outer surfaces formed with a part-spherical face, metal supporting means in said housing having internal conical faces adapted to engage said spherical outer surfaces and to permit oscillatory movement of each plain bearing sleeve and a spring arranged between the two plain bearing sleeves and adapted to maintain said spherical surfaces in engagement with said conical faces.

3. A bearing mounting for a rotatable shaft, comprising a bearing housing, two plain metal bearing sleeves spaced apart within said housing and adapted to slide axially on said shaft and having at least a part of their outer surfaces formed with convexly curved faces, two supporting members axially slidable in said housing and adapted to engage the inner portion of each convexly curved surface, a shoulder at each end of said housing and a spring disposed between the two supporting members so as to maintain them in engagement with said convexly curved surfaces.

4. A bearing mounting for a rotatable shaft having a shoulder formed thereon, which mounting comprises a bearing housing having an internal shoulder at each end thereof, two plain bearing sleeves spaced apart within said housing adapted to slide axially on said shaft and each having at least a part of its outer surface formed with a convex spherical face and one of which bearing sleeves is retained between the shoulder on said shaft and the shoulder at one end of the housing, two pairs of supporting members axially slidable within said housing, the two members of each pair being arranged one at either end of a bearing sleeve so as to engage said spherical surface and so as to permit oscillatory rocking movement of the bearing sleeves, and a compression spring arranged between the two innermost supporting members.

5. A bearing mounting for a rotatable shaft, comprising a bearing housing, two plain metal bearing sleeves spaced apart within said housing and adapted to slide axially on said shaft and having at least a part of their outer surfaces formed with a part-spherical face towards the outer end thereof, an internal conical supporting surface at each end of said housing adapted to engage one of the aforesaid spherical surfaces and a spring arranged between and adapted to engage said plain bearing sleeves so as to maintain them in engagement with said conical surfaces.

6. A grinding machine comprising a grinding wheel shaft and a work-carrying shaft, a bearing mounting for at least one of said shafts, comprising a bearing housing, two plain metal bearing sleeves spaced apart within said housing and having a clearance of the order of .0001 of an inch and not greater than .0005 of an inch between them and the shaft, each of which bearing sleeves is provided with a convex spherical outer surface at each end thereof and separated by a cylindrical surface, two supporting members axially slidable in said housing and adapted to engage the spherical surfaces on the bearing sleeves, a shoulder at each end of said housing and a spring disposed between the supporting members so as to maintain them in engagement with said spherical surfaces.

FREDERICK WILLIAM McCARTNEY.